United States Patent [19]

Buscan et al.

[11] Patent Number: 6,162,781
[45] Date of Patent: Dec. 19, 2000

[54] FOAM CONTROL GRANULE FOR PARTICULATE LAUNDRY DETERGENT COMPOSITIONS

[75] Inventors: Marinela Buscan; Francois Delwel; Angela Di-Pietro, all of Vlaardingen, Netherlands

[73] Assignee: Lever Brothers Company, div. of Conopco Inc., New York, N.Y.

[21] Appl. No.: 09/373,274

[22] Filed: Aug. 12, 1999

Related U.S. Application Data

[62] Division of application No. 09/204,571, Dec. 3, 1998, abandoned.

[30] Foreign Application Priority Data

Dec. 8, 1997 [GB] United Kingdom .................. 9725986

[51] Int. Cl.$^7$ ...................................................... C11D 11/00
[52] U.S. Cl. ..................... 510/276; 510/349; 510/350; 510/351; 510/352; 510/356; 510/357; 510/400; 510/438; 510/441; 510/443; 510/444; 510/452; 510/456; 510/457; 510/466; 510/509; 510/511; 510/531; 510/347
[58] Field of Search ...................................... 252/321–323, 252/358, 327, 330, 331, 333; 510/276, 349–352, 356, 357, 400, 438, 441, 443, 452, 456, 457, 466, 509, 511, 531, 347, 444

[56] References Cited

U.S. PATENT DOCUMENTS

| | | | |
|---|---|---|---|
| 4,818,292 | 4/1989 | Iley et al. | 106/210 |
| 5,045,225 | 9/1991 | Aronson et al. | 252/174.15 |
| 5,318,718 | 6/1994 | Seiter et al. | 252/174.15 |
| 5,456,855 | 10/1995 | De Cupere | 252/174.15 |
| 5,540,856 | 7/1996 | Wevers et al. | 510/347 |
| 5,762,647 | 6/1998 | Brown et al. | 8/137 |
| 5,804,544 | 8/1998 | Powell et al. | 510/347 |

FOREIGN PATENT DOCUMENTS

| | | |
|---|---|---|
| 266 863 | 5/1988 | European Pat. Off. . |
| WO 96/06921 | 3/1996 | European Pat. Off. . |
| 91/12306 | 8/1991 | WIPO . |
| 92/20770 | 11/1992 | WIPO . |
| 95/04124 | 2/1995 | WIPO . |
| 96/06921 | 3/1996 | WIPO . |

OTHER PUBLICATIONS

Derwent abstract of WO 92/20770 Nov. 26, 1992.
Derwent abstract of WO 91/12306 Aug. 22, 1991.
Derwent abstract of WO 95/04124 Feb. 9, 1995.
U.K. search report in the application of GB 9725986.5 Mar. 18,1998.
International Search Report in the application of PCT/EP 98/07534 Apr. 21, 1999.

*Primary Examiner*—Mark Kopec
*Assistant Examiner*—Brian P. Mruk
*Attorney, Agent, or Firm*—Rimma Mitelman

[57] ABSTRACT

Foam control granules, for use in particulate laundry detergent compositions, comprise a mobile hydrophobic foam control agent, preferably silicone oil in admixture with hydrophobic silica, optionally combined with a mixture of a hydrocarbon such as petroleum jelly and an alkylphosphoric acid salt, sorbed onto a porous absorbent inorganic carrier comprising or consisting of anhydrous sodium carbonate, preferably light soda ash. When such granules are prepared by mixing and granulating in a high shear mixer/granulator, the addition of from 1 to 10 wt % water after mixing and granulation results in granules having improved flow properties.

2 Claims, No Drawings

FOAM CONTROL GRANULE FOR PARTICULATE LAUNDRY DETERGENT COMPOSITIONS

This is a divisional of Ser. No. 09/204,571 filed Dec. 3, 1998 abandoned.

TECHNICAL AREA

The present invention relates to a granular foam control material for incorporation into particulate laundry detergent compositions suitable for use in drum-type automatic washing machines; to processes for preparing the foam control material; and to particulate laundry detergent compositions containing it.

BACKGROUND AND PRIOR ART

It is well known that laundry detergent compositions for use in washing machines having a closed drum, such as European-type front loading automatic washing machines, require foam control to prevent overfoaming. Foam control granules in which mobile liquid or viscous-liquid hydrophobic foam control agents such as silicone oil or hydrocarbons are sorbed onto a particulate carrier material are well known in the art.

The main problem associated with such granules is to achieve a good balance between delivery of the mobile hydrophobic foam control agent during the wash cycle and storage stability. The hydrophobic foam control agent must be retained in or on the carrier material during storage, but released efficiently from the carrier material during the wash cycle. EP 266 863A (Unilever) discloses a foam control granule in which a mobile hydrophobic foam control agent, especially a silicone oil, is sorbed onto a fine-pored inorganic carrier based on sodium carbonate, preferably light soda ash, crystal-growth-modified sodium sesquicarbonate or crystal-growth-modified Burkeite. These carrier materials combine a high pore volume with a small pore diameter and therefore have a high capacity for retaining the foam control agent. They are also highly water-soluble and release the foam control agent rapidly and effectively during the wash cycle.

These granules differ from other known granules in which the carrier material, for example, a native or modified starch, consists of very small primary-particles, for example, having a particle size of 1–10 μm, and the hydrophobic foam control agent, generally plus one or more binders, is used to build up larger particles by agglomeration. In foam control granules of that type, the primary particles of the carrier material are essentially non-porous and the silicone oil is adsorbed onto their surfaces, that is to say, the porosity of the final granules occupied by the silicone oil is inter-particle porosity.

In the foam control granules with which the present invention is concerned, the mobile foam control agent is predominantly within the intraparticle pore system of the carrier material, although a limited amount of agglomeration may also occur. The intra-particle pore structure allows entrapment of the foam control agent within the primary particles of the carrier material, but still gives rapid and efficient delivery of the foam control agents in the wash at both high and low wash temperatures.

The small pore size also means that the foam control agent is released in the wash in the form of especially small particles or droplets, which increases its foam control efficiency.

These granules show excellent foam control and storage stability within detergent compositions. However, it has been found that when granules using the preferred carrier material of light soda ash are prepared by high speed mixing and granulation, the flow properties of the granules themselves are not always ideal, and some tendency towards caking has been observed. This can cause problems in the bulk handling and transportation of the granules prior to their incorporation in detergent products.

It has now unexpectedly been discovered that the granules have significantly better flow properties if a controlled amount of water is added after the mixing and granulation step.

PRIOR ART

EP 266 863A (Unilever), discussed above, and WO 96 06921A (Unilever) disclose antifoam granules comprising a hydrophobic foam control system, for example, silicone oil/silica/alkyl phosphate/petroleum jelly, on a sodium carbonate-based carrier having small intraparticular pores, for example, light soda ash. There is no disclosure of granules containing added water.

WO 92 20770A (Henkel) discloses a process for the manufacture of an antifoam granule containing a silicone oil and a sodium carbonate/sodium sulphate carrier, using a mixer/granulator, for example, a Lödige mixer. Water is added during the granulation process, but before the addition of the silicone oil.

WO 91 12306A (Henkel) discloses a process for the production of antifoam granules containing silicone oil/silica optionally plus paraffin oil or wax, by spray-drying an aqueous slurry containing the silicone-based antifoam material, dispersed in an aqueous cellulose ester/cellulose ether solution, and carrier salts (sodium silicate/carbonate/sulphate).

WO 95 04124A (Henkel) discloses antifoam granules of high bulk density and low water content, prepared by extruding a mixture of a carbonate-based carrier material and an antifoam-active material, cutting into noodles, and spheronising.

DEFINITION OF THE INVENTION

The present invention provides a foam control granule for use in a particulate detergent composition, which granule comprises (i) from 10 to 40 wt % of a hydrophobic foam control agent at least partially liquid at a temperature within the range of from 5 to 90° C., sorbed onto (ii) from 50 to 90 wt % of a porous absorbent inorganic carrier comprising or consisting of anhydrous sodium carbonate and having a mean particle diameter not exceeding 2000 μm, a pore volume of from 0.2 to 1.0 cm$^3$/g and a median pore diameter not greater than 20 μm, the granule further containing from 1 to 10 wt % of water.

The invention further provides a process for the preparation of a foam control granule as defined above, which comprises mixing and granulating the ingredients in a high shear mixer/granulator, in which process the water is added to the granulator after the carrier and the foam control agent have been granulated together.

Also provided by the invention is a particulate foam-controlled laundry detergent composition comprising:

(a) from 5 to 60 wt % of organic surfactant, (b) from 5 to 80 wt % of detergency builder, (c) from 0.1 to 5 wt % of foam control granules as defined above, and (d) other conventional detergent ingredients to 100 wt %.

DETAILED DESCRIPTION OF THE INVENTION

The Foam Control Granule

Foam control granules to which the present invention is especially applicable are described in detail in the aforementioned EP 266 863A (Unilever). As indicated above, the granules have two essential components: a hydrophobic foam control agent, which may itself be a composite of a number of different materials; and a porous inorganic carrier material based on anhydrous sodium carbonate.

The Porous Inorganic Carrier Material

The porous inorganic carrier material, which comprises or consists of anhydrous sodium carbonate, is characterised by a pore system of large volume, composed of a large number of very fine pores. The small pore size ensures not only that the hydrophobic foam control agent is retained strongly during transit and storage, but that when it is eventually released into the wash liquor it is in the form of especially small particles or droplets.

The carrier material has a mean particle diameter not exceeding 2000 μm, more preferably from 80 to 2000 μm; a pore volume of from 0.2 to 1.0 cm³/g, more preferably from 0.25 to 1.0 cm³/g; and a median pore diameter not greater than 20 μm. Pore volumes and pore diameters may be measured accurately by the recognised technique of mercury porosimetry. Pore volume may also be determined more rapidly by liquid titration.

Advantageously the carrier material has a surface area greater than 1 m²/g.

It is to be understood that the carrier particles can be crystalline structures having a mean particle diameter of form 0.1 to 50 μm; these are generally known as primary particles. Groups of such primary particles become agglomerated to form secondary particles or carrier particles or agglomerates having a mean particle diameter of at least 80 μm as defined above.

It is an essential feature of the invention that the porous inorganic carrier material consists of or includes anhydrous sodium carbonate. A suitable material that is available as an article of commerce is light soda ash, which possesses suitable pore volume, pore size and mean particle diameter. The mean particle diameter of this material is generally in the range of from 90 to 130 μm, and the pore volume is generally in the range of from 0.28 to 0.33 ml/g. A suitable commercially available material is light grade sodium carbonate from Solvay.

Dense anhydrous sodium carbonate (dense soda ash, heavy soda ash) is not suitable for use as a carrier material in the present invention because it does not possess the requisite porosity and pore structure and hence does not have adequate carrying capacity.

The carrier material preferably constitutes from 50 to 90 wt %, more preferably from 50 to 80 wt % and most preferably from 60 to 80 wt %, of the foam control granule.

The Hydrophobic Foam Control Agent

The hydrophobic foam control agent preferably comprises a silicone oil, optionally assisted by a fine particulate foam control promoter which is a hydrophobic silica. Silicone oils, more properly termed liquid polydiorganosiloxanes, are linear or partially branched polymers of the average formula I:

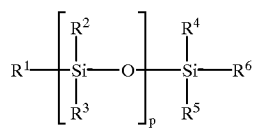

(I)

wherein each R independently can be an alkyl or aryl radical, for example, a methyl, ethyl, propyl, isobutyl or phenyl group, and may be interrupted or terminated by a heteroatom, eg in an —OH, —NH$_2$ or an —NHR group; or may represent a bond to further groups, for example, —O—Si— or —O—Si—(CH$_2$)$_q$—Si— (q=1 or 2), to form another chain. The amount of branching preferably does not exceed about 5%, that is to say, not more than 5% of the repeat units within square brackets in formula I above should include bonds to further chains.

Silicone oils may have dynamic viscosities ranging, for example,. from 3000 to 40 000 mpa.s.

As indicated previously, the foam control efficiency of a silicone oil is significantly increased by the presence of suspended particles of a finely divided particulate foam control promoter, and a preferred foam control promoter is hydrophobised silica. The silica may be a fumed silica, a precipitated silica, or a silica made by the gel formation technique. These silica particles may be rendered hydrophobic, for example, by treating them with dialkylsilyl groups and/or trialkylsilyl groups bonded directly onto the silica.

Examples of suitable commercially available silicone oil/silica compounds include Dow Corning DB 100, DC 2-3510 and Q2-3302, Wacker S-131 and Rhone-Poulenc 20 472.

Silicone oils and finely divided hydrophobic silicas are also available separately.

Advantageously, a hydrocarbon foam control agent may also be present. A preferred class of hydrocarbon foam control agents is constituted by hydrocarbon waxes, and an especially preferred material is petroleum jelly. This material, which may be regarded as a mixture of liquid and solid hydrocarbons, is a soft solid at ambient temperature and liquefies over the 35–40° C. range. A suitable commercially available material is Silkolene (Trade Mark) 910 ex Dalton & Co.

Petroleum jelly may advantageously be assisted by a fine particulate foam control promoter is an alkylphosphoric acid or salt, the acid having the formula II:

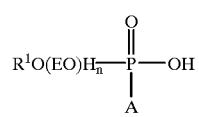

(II)

wherein A is —OH or R$^2$O(EO)$_m$, R$^1$ and R$^2$ are the same or different C$_{12}$–C$_{24}$ linear or branched-chain alkyl or alkenyl groups, m and n which may be the same or different are zero or an integer from 1 to 6.

A commercially available example of such a material is Phospholan Alf 5 (Marchon 7062)(Trade Marks) ex Marchon Ltd which is a C$_{12}$ alkyl phosphoric acid, ie a material of the formula II given earlier in which R$^7$ is C$_{12}$ alkyl, p is zero and A is a hydroxyl group.

Advantageously, the petroleum jelly may be premixed with the alkylphosphoric acid foam control promoter. The fine particulate material assists in stabilising the intimate mixture as well as contributing to the foam control performance of the final granule A suitable mixture may contain from 10 to 30 wt % alkylphosphoric acid and from 70 to 90 wt % petroleum jelly.

The Added Water

The added water amounts to from 1 to 10 wt %, preferably from 2 to 8 wt %, more preferably from 2 to 6 wt %, of the granules.

Initial studies indicated that amounts of water ranging from from 3 to 5 wt % were preferred. Subsequent work on a larger scale has indicated a preference for slightly higher levels of water, for example, from 5 to 6 wt %.

Preferred Embodiment of the Invention

A preferred granule of the invention comprises:
  (a) from 10 to 25 wt % of silicone oil in admixture with hydrophobic silica;
  (b) from 5 to 15 wt % of petroleum jelly;
  (c) from 1 to 5 wt % of alkylphosphoric acid or salt of the formula I above;
  (d) from 50 to 80 wt %, more preferably from 60 to 80 wt %, of the porous inorganic carrier; and
  (e) from 1 to 10 wt % of water.

Processes for Manufacture of the Foam Control Granules

As indicated previously, the preferred process for manufacture of the foam control granules of the invention comprises the mixing and granulation of all ingredients in a continuous or batch high speed mixer/granulator.

Suitable mixer/granulators are those which provide high shear during mixing, and contain stirring elements and optionally cutting elements, which can preferably be operated independently of the stirring elements.

Suitable mixers for batch operation include the Fukae (Trade Mark) FS high-speed mixer/granulators. These are bowl-shaped with a vertical axis, and contain both stirring and cutting elements which can be operated independently. Continuous production may suitably be carried out using the Lödige (Trade Mark) CB30 Recycler, which has a horizontal axis provided with stirring elements.

If the process is carried out batchwise, it is essential that the water be added only after the carrier and the hydrophobic foam control agent have been granulated together. The preferred order of addition is the carrier, the hydrophobic foam control agent, and the water.

If the process is carried out continuously, the point of entry of the water into the mixer should be late in the process, at a position in the mixer at which granulation of the carrier and the hydrophobic foam control agent will be substantially complete.

A preferred process for the preparation of the preferred foam control granule of the invention described above comprises the following steps:
  (i) mixing the alkylphosphoric acid or salt (c) and the petroleum jelly (b) to form a premix (f);
  (ii) mixing and granulating the porous inorganic carrier (d), the silicone oil/silica (a) and the premix (f) in a high shear mixer/granulator;
  (iii) subsequently introducing the water (e) into the granulator.

If the process is carried out batchwise, the order of addition should be the carrier, the silicone oil (or silicone/silica compound), the premix, then the water last.

If the process is carried out continuously, the point of entry of the water should be such that it enters the mixer after granulation of the carrier and the foam control agent is substantially complete.

Step (i), the formation of the premix, should be carried out at a temperature at which the petroleum jelly is liquid, and suitably at 75 to 95° C. The silicone oil should also be heated, for example, to a temperature in the range of 55 to 75° C., before it enters the mixer. The two liquids, maintained at these temperatures, should be dosed separately into the mixer. During mixing and granulation the temperature of the mixer may suitably be maintained at a similar temperature of 55 to 75° C.

The water, which as described above is added separately at a late stage in the granulation, may suitably and conveniently be added at ambient temperature.

After granulation, the product may be cooled to a temperature below 35° C. using a fluid bed. Fines and oversize particles may be removed at this stage. The product is a crisp granular material, having an average particle size of for example 500–1000 micrometres, suitable for addition by dry mixing to a particulate detergent composition.

Detergent Compositions

The foam control granules of the present invention are intended for use in particulate detergent compositions. The granules may suitably be incorporated in amounts of from 0.25 to 10 wt %, preferably from 0.5 to 5 wt %, the optimum level depending on the amount and type of surfactant present in the detergent composition, and the amount and type of silicone oil in the foam control granule.

Detergent compositions of the invention will generally contain detergent-active compounds and detergency builders, and may optionally contain bleaching components and other active ingredients to enhance performance and properties.

Detergent-active compounds (surfactants) may be chosen from soap and non-soap anionic, catibnic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch. The preferred detergent-active compounds that can be used are soaps and synthetic non-soap anionic and nonionic compounds. The total amount of surfactant present is suitably within the range of from 5 to 40 wt %.

Anionic surfactants are well-known to those skilled in the art. Examples include alkylbenzene sulphonates, particularly linear alkylbenzene sulphonates having an alkyl chain length of $C_8$–$C_{15}$; primary and secondary alkylsulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Detergent compositions suitable for use in most automatic fabric washing machines generally contain anionic non-soap surfactant, or nonionic surfactant, or combinations of the two in any ratio, optionally together with soap. The detergent compositions of the invention will generally also contain one or more detergency builders. The total amount of detergency builder in the compositions will suitably range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate, may also be present, but on environmental grounds those are no longer preferred.

Zeolite builders may suitably be present in amounts of from 5 to 60 wt %, preferably from 10 to 50 wt %. Amounts of from 10 to 45 wt % are being especially suitable for particulate (machine) fabric washing compositions. The zeolite used in most commercial particulate detergent compositions is zeolite A. Advantageously, however, maximum aluminium zeolite P (zeolite MAP) described and claimed in EP 384 070A (Unilever) may be used. Zeolite MAP is an alkali metal aluminosilicate of the P type having a silicon to aluminium ratio not exceeding 1.33, preferably not exceeding 1.15, and more preferably not exceeding 1.07.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %. Builders, both inorganic and organic, are preferably present in alkali metal salt, especially sodium salt, form.

Detergent compositions according to the invention may also suitably contain a bleach system. Preferably this will include a peroxy bleach compound, for example, an inorganic persalt or an organic peroxyacid, capable of yielding hydrogen peroxide in aqueous solution.

Preferred inorganic persalts are sodium perborate monohydrate and tetrahydrate, and sodium percarbonate. Especially preferred is sodium percarbonate having a protective coating against destabilisation by moisture.

Sodium percarbonate having a protective coating comprising sodium metaborate and sodium silicate is disclosed in GB 2 123 044B (Kao). The peroxy bleach compound is suitably present in an amount of from 5 to 35 wt %, preferably from 10 to 25 wt %.

The peroxy bleach compound may be used in conjunction with a bleach activator (bleach precursor) to improve bleaching action at low wash temperatures. The bleach precursor is suitably present in an amount of from 1 to 8 wt %, preferably from 2 to 5 wt %. Preferred bleach precursors are peroxycarboxylic acid precursors, more especially peracetic acid precursors and peroxybenzoic acid precursors; and peroxycarbonic acid precursors. An especially preferred bleach precursor suitable for use in the present invention is N,N,N',N'-tetracetyl ethylenediamine (TAED).

A bleach stabiliser (heavy metal sequestrant) may also be present. Suitable bleach stabilisers include ethylenediamine tetraacetate (EDTA) and the polyphosphonates such as Dequest (Trade Mark), EDTMP.

The compositions of the invention may contain alkali metal, preferably sodium, carbonate, in order to increase detergency and ease processing. Sodium carbonate may suitably be present in amounts ranging from 1 to 60 wt %, preferably from 2 to 40 wt %.

Powder flow may be improved by the incorporation of a small amount of a powder structurant, for example, a fatty acid (or fatty acid soap), a sugar, an acrylate or acrylate/maleate polymer, or sodium silicate. One preferred powder structurant is fatty acid soap, suitably present in an amount of from 1 to 5 wt %.

Other materials that may be present in detergent compositions of the invention include sodium silicate; antiredeposition agents such as cellulosic polymers; fluorescers; inorganic salts such as sodium sulphate; proteolytic and lipolytic enzymes; dyes; coloured speckles; perfumes; and fabric softening compounds. This list is not intended to be exhaustive.

Preparation of the Detergent Compositions

Detergent compositions of the invention may be prepared by any suitable method. Particulate detergent compositions of lower bulk density, for example 400–500 g/liter, are suitably prepared by spray-drying a slurry of compatible heat-insensitive ingredients, and then spraying on or postdosing those ingredients unsuitable for processing via the slurry. The skilled detergent formulator will have no difficulty in deciding which ingredients should be included in the slurry and which should not. The foam control granules of the invention should be postdosed.

Preferred particulate detergent compositions of the invention having a bulk density of at least 500 g/l, preferably at least 650 g/liter, and more preferably at least 700 g/liter, may be prepared by post-tower densification of a spray-dried powder, or directly by mixing and granulation of raw materials, advantageously using a high-speed mixer/granulator as described above. Such processes are disclosed, for example, in EP 340 013A, EP 367 339A, EP 390 251A and EP 420 317A (Unilever) As with a spray-dried powder, less robust or more heat-sensitive ingredients, including the foam control granules of the present invention, should be postdosed to the dense granular base powder.

EXAMPLES

The invention will now be illustrated by the following non-limiting Examples, in which parts and percentages are by weight unless otherwise stated.

The ingredients used are abbreviated as follows:

Silicone: DB100, a silicone oil/hydrophobic silica compound ex Dow Corning

Alf 5: Phospholan Alf 5 (Marchon 7062) ex Marchon (Albright & Wilson)

Pet jelly: Silkolene 910 ex Dalton & Co

Light soda ash: light grade sodium carbonate ex Solvay

In the Examples flow properties are expressed in terms of dynamic flow rate (DFR), in ml/s, measured as described below.

Dynamic Flow Rate

The apparatus used consists of a cylindrical glass tube having an internal diameter of 35 mm and a length of 600 mm. The tube is securely clamped in a position such that its longitudinal axis is vertical. Its lower end is terminated by means of a smooth cone of polyvinyl chloride having an internal angle of 15° and a lower outlet orifice of diameter 22.5 mm. A first beam sensor is positioned 150 mm above the outlet, and a second beam sensor is positioned 250 mm above the first sensor.

To determine the dynamic flow rate of a powder sample, the outlet orifice is temporarily closed, for example, by covering with a piece of card, and powder is poured through a funnel into the top of the cylinder until the powder level is about 10 cm higher than the upper sensor; a spacer between the funnel and the tube ensures that filling is uniform. The outlet is then opened and the time t (seconds) taken for the powder level to fall from the upper sensor to the lower sensor is measured electronically. The measurement is normally repeated two or three times and an average value taken. If V is the volume (ml) of the tube between the upper and lower sensors, the dynamic flow rate DFR (ml/s) is given by the following equation:

$$DFR = \frac{V}{t} \text{ ml/s}$$

The averaging and calculation are carried out electronically and a direct read-out of the DFR value obtained.

Examples 1 to 3, Comparative Example A

Four different granules were prepared to the compositions shown below:

|  | Example A | Example 1 | Example 2 | Example 3 |
|---|---|---|---|---|
| Silicone | 18.0 | 18.0 | 18.0 | 18.0 |
| Alf 5 | 2.4 | 2.4 | 2.4 | 2.4 |
| Pet jelly | 9.6 | 9.6 | 9.6 | 9.6 |
| Light soda ash | 70.0 | 68.0 | 65.0 | 62.0 |
| Water | — | 2.0 | 5.0 | 8.0 |

The granules were prepared on bench scale using an Eirich (Trade Mark) R 02 E high shear granulator.

The petroleum jelly and Alf 5 were premixed in a 4:1 ratio at 80° C. The silicone compound was heated to 60° C. The water used was tap water at ambient temperature (25° C). The order of addition of the materials to the mixer was light soda ash, silicone compound, Alf 5/petroleum jelly premix, water: attempts to add the water earlier in the process (before the silicone oil, or before the premix) resulted in overgranulation (the formation of large lumps).

After granulation the granules were cooled to room temperature. Samples of the granules were stored at 37° C. and 70% relative humidity.

The dynamic flow rates of the fresh and stored products were as follows:

| DFR (ml/s) | Example A | Example 1 | Example 2 | Example 3 |
|---|---|---|---|---|
| fresh | 0 | 46 | 86 | 94 |
| 24 hours | 0 | 51 | 103 | 116 |
| 4 weeks | 94 | 142 | 135 | 134 |

Samples of the fresh and stored (4 weeks) granules were examined under the electron microscope. This showed the growth of sodium carbonate monohydrate (thermonatrite) crystals on the surface of all the stored granules. X-ray diffraction analysis confirmed this finding, and also indicated that Comparative Example A (fresh) contained only traces of thermonatrite; Examples 1, 2 and 3 (fresh) contained substantial amounts of thermonatrite although the crystals were too small to be visible under the microscope.

These findings are summarised in the following table:

| Thermonatrite level | Example A | Example 1 | Example 2 | Example 3 |
|---|---|---|---|---|
| fresh | traces | high (small crystals) | high (small crystals) | high (small crystals) |
| stored (4 weeks) | high | high | high | high |

Without wishing to be bound by theory, it is surmised that the presence of these crystals reduces the contact possible between sticky materials (silicone compound, Alf 5/petroleum jelly) in adjacent particles.

Examples 4 and 5, Comparative Example B

A similar procedure was carried out on a larger scale using continuous mixing and granulation in a Lödige CB30 Recycler.

The granule compositions were as follows:

|  | Example B | Example 4 | Example 5 |
|---|---|---|---|
| Silicone | 17.0 | 18.0 | 18.0 |
| Alf 5 | 2.4 | 2.4 | 2.4 |
| Pet jelly | 9.6 | 9.6 | 9.6 |
| Light soda ash | 71.0 | 68.0 | 65.0 |
| Water | — | 2.0 | 5.0 |

The petroleum jelly and Alf 5 were premixed in a 4:1 ratio at 80° C. The silicone compound was heated to 70° C. Both liquids were dosed separately into the Recycler. Light soda ash was transferred by means of a screw conveyor to a dosing hopper. Water (tap water at ambient temperature, 23° C.) was pumped separately into the last part of the Recycler.

Conditions varied slightly for the three different products, as indicated below.

After granulation, the products were transported to a fluid bed, where they were cooled to a temperature below 35° C. Coarse particles (>1400 μm) were removed by using a Mogenson sieve.

Comparative Example B (no added water)

| Premix temperature | 88° C. |
|---|---|
| Temperature of heating jacket of Recycler: | 68° C. |
| Silicone compound temperature | 72° C. |
| Throughput | 500 kg/h |

Recycler (shaft rotational) speeds of 506, 608, 1005 and 1513 rpm were used for different runs, with residence times of 13–15 seconds. At high speeds the granule became very sticky and large lumps formed.

Examples 4 and 5 (2 and 5 wt % added water)

| | |
|---|---|
| Premix temperature | 75° C. |
| Temperature of heating jacket of Recycler: | 70° C. |
| Silicone compound temperature | 68° C. |
| Throughput | 500 kg/h |
| Recycler speed | 506 rpm |
| Residence time | 10–12 sec |

Samples of the granules were stored for four weeks at 37° C. and 70% relative humidity. One set of samples was stored in open boxes, the other in "big bags": these are large bags of reinforced plastic, of cubic capacity 0.5–2 m$^3$, normally with tie closures which are not water- or airtight, commonly used for handling and transporting bulk powders and granules.

The dynamic flow rates of the granules were as shown below. The values for the fresh samples and those stored in open boxes were taken from five samples and averaged.

| DFR (ml/s) | Example B | Example 4 | Example 5 |
|---|---|---|---|
| fresh | 0 | 111 | 116 |
| stored in open boxes | 0 | 104 | 116 |
| stored in "big bags" | 0 | 53 | 60 |

Examples 6 to 10, Comparative Example C

The procedure of Examples 4 and 5 was repeated using a main plant scale Lödige CB50 Recycler.

The granule compositions were as follows:

| Example | C | 6 | 7 | 8 | 9 | 10 |
|---|---|---|---|---|---|---|
| Silicone | 17.0 | 17.0 | 17.0 | 17.0 | 17.0 | 17.0 |
| Alf 5 | 2.4 | 2.4 | 2.4 | 2.4 | 2.4 | 2.4 |
| Pet jelly | 9.6 | 9.6 | 9.6 | 9.6 | 9.6 | 9.6 |
| Light soda ash | 71.0 | 69.0 | 68.0 | 67.0 | 66.0 | 65.0 |
| Water | 0 | 2.0 | 3.0 | 4.0 | 5.0 | 6.0 |

Conditions in the Recycler were as follows:

| | |
|---|---|
| Premix temperature | 70–80° C. |
| Temperature of heating jacket of Recycler: | 80° C. |
| Silicone compound temperature | 60–70° C. |
| Throughput | 3.5–4.5 t/h |
| Recycler speed | 360–1000 rpm* |
| Residence time | 10–12 sec |

*Recycler speed can be used to fine-tune the physical properties of the granule.

After granulation, the products were transported to a fluid bed, where they were cooled to a temperature below 35° C. Coarse particles (>1400 μm) were removed by using a Allgaier sieve.

The dynamic flow rates of the granules were as shown below. The values were taken from five samples and averaged.

| Example | C | 6 | 7 | 8 | 9 | 10 |
|---|---|---|---|---|---|---|
| water (wt %) | 0 | 2 | 3 | 4 | 5 | 6 |
| DFR (ml/s) | 0 | 70 | 85 | 96 | 110 | 120 |

Example 11, Comparative Example D Foam Control in a Detergent Composition

Two particulate zeolite-built laundry detergent compositions were prepared to the following formulation (in weight percent):

| | |
|---|---|
| Na primary alcohol sulphate | 11.51 |
| Nonionic surfactant C$_{12-15}$ 7EO | 6.25 |
| Soap | 1.97 |
| Zeolite MAP (anhydrous) | 22.32 |
| Na citrate 2aq | 3.59 |
| Light soda ash | 2.89 |
| Sodium carboxymethyl cellulose (68%) | 0.95 |
| Moisture, salts, etc | 4.27 |
| Soil release polymer* adjunct (18% polymer) | 1.5 |
| Acrylic/maleic copolymer** (93% granule) | 1.00 |
| Na carbonate | 3.40 |
| Na bicarbonate | 1.00 |
| Carbonate/29% silicate cogranule*** | 5.5 |
| TAED white (83%) | 6.35 |
| Coated Percarbonate (13.5 avO$_2$) | 22.00 |
| EDTMP**** | 0.42 |
| Protease (Savinase 12.0T 3250 GU/mg) | 0.78 |
| Lipase (Lipolase 100T 187 LU/mg) | 0.12 |
| Perfume | 0.45 |
| Antifoam granule (see below) | 3.73 |

*Sokalan (Trade Mark) HP22 ex BASF
**Sokalan (Trade Mark) CP5 ex BASF
***Nabion (Trade Mark) 15 ex Rhône-Poulenc
****Dequest (Trade Mark) 2047 ex Monsanto The antifoam granules used were as follows:
Example 11: the granule of Example 4 (2% added water)
Comparative Example D: the granule of Comparative Example B (no added water).

Foam control was tested in specially adapted Whirlpool (Trade Mark) AWM front-loading automatic washing machines in which the front porthole was calibrated with a linear scale to denote foam height, from 0 (representing no foam) to 10 (a full porthole).

The wash conditions were as follows:
Washload: 3 kg, clean
Water hardness: 27° FH
Powder dosage: 120 g
Wash temperature: 40° C.

A special extended two-hour wash cycle with prewash, flood, main wash and nine rinses was used in order to provide the most stringent possible test conditions.

Four runs were carried out for each powder.

The foam profiles were very similar, all showing a momentary peak after about 80 minutes, at the beginning of the final sequence of rinses; in one of the four runs of Example 11 the peak reached 10 (full porthole), but only for a very short time. There were other smaller peaks at earlier stages in the wash cycle, but all were below 8, and during the main wash phase the foam height remained in the 4–6 range. In general, the foam control of Example 11 was slightly, but not significantly, weaker than than that of Comparative Example D throughout the wash cycle. The average values of the foam height over the whole wash cycle were as follows:

| | |
|---|---|
| Example 11 | 3.70 |
| Comparative Example D | 2.75 |

Example 12, Comparative Example E

The following antifoam granules were incorporated, in the same amount (3.73 wt %), into the laundry detergent composition used in Example 11:
Example 12: the granule of Example 10 (6% added water)
Comparative Example E: the granule of Comparative Example C (no added water).

Example 13, Comparative Example F

Antifoam granules as detailed below were incorporated into a particulate phosphate-built laundry detergent composition having the following formulation:

| | |
|---|---|
| Na-LAS | 6.30 |
| Nonionic surfactant 7EO | 4.05 |
| Nonionic surfactant 3EO | 3.15 |
| Soap | 0.28 |
| Fatty acid | 0.32 |
| Sodium tripolyphosphate | 23.94 |
| Sodium diisilicate | 6.31 |
| Sodium carboxymethyl cellulose (68%) | 0.38 |
| Moisture, salts etc | 9.27 |
| Soil release polymer HP23 | 1.24 |
| Acrylic/maleic copolymer** (93% granule) | 1.13 |
| Sodium carbonate | 8.49 |
| Sodium sulphate | 9.87 |
| TAED (83%) | 2.22 |
| Polyvinylpyrrolidone (95%) | 0.07 |
| Sodium perborate tetrahydrate | 20.00 |
| EDTMP**** | 0.55 |
| Fluorescer DMS-X (9.9%) | 0.60 |
| Protease (Savinase 12.0T 3250 GU/mg) | 0.40 |
| Lipase (Lipolase 100T 187 LU/mg) | 0.03 |
| Termamyl 6.0T | 0.28 |
| Antifoam granule (see below) | 0.88 |
| Perfume | 0.24 |

The antifoam granules used were as follows:
Example 13: the granule of Example 10 (6% added water)
Comparative Example F: the granule of Comparative Example C (no added water).

What is claimed is:

1. A process for the preparation of a foam control granule for use in a particulate detergent composition, which granule comprises (i) from 10 to 40 wt % of a hydrophobic foam control agent at least partially liquid at a temperature within the range of from 5 to 90° C., sorbed onto (ii) from 50 to 90 wt % of a porous absorbent inorganic carrier comprising anhydrous sodium carbonate and having a mean particle diameter not exceeding 2000 $\mu$m, a pore volume of from 0.2 to 1.0 cm$^3$/g and a median port diameter not greater than 20 $\mu$m, (iii) from 1 to 10 wt % water, which process comprises mixing and granulating the ingredients in a high shear mixer/granulator, wherein the water is added to the granulator after the carrier and the foam control agent have been granulated together.

2. A process for the preparation of a foam control granule which granule comprises:

(a) from 10 to 25 wt % of silicone oil in admixture with hydrophobic silica;

(b) from 5 to 15 wt % of petroleum jelly;

(c) from 1 to 5 wt % of alkylphosphoric acid or salt of the formula II

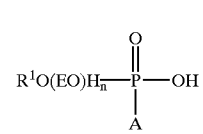

(II)

wherein A is —OH or R$^2$O(EO)$_m$, R$^1$ and R$^2$ are the same or different C$_{12}$–C$_{24}$ linear or branched-chain alkyl or alkenyl groups, m and n may be the same or different are zero or an integer from 1 to 6, (d) from 50 to 80 wt % of the porous inorganic carrier; and (e) from 1 to 10 wt % of water, the process comprising the steps of:

(i) mixing the alkylphosphoric acid or salt (c) and the petroleum jelly (b) to form a premix (f);

(ii) mixing and granulating the silicone oil/hydrophobic silica (a), the premix (f) and the porous inorganic carrier (d) in a high shear mixer/granulator;

(iii) subsequently adding the water (e) to the granulator.

* * * * *